(12) United States Patent
Veyrac et al.

(10) Patent No.: US 11,353,580 B2
(45) Date of Patent: Jun. 7, 2022

(54) PROXIMITY RADAR METHOD AND SYSTEM FOR A ROTARY-WING AIRCRAFT

(71) Applicant: THALES, Courbevoie (FR)

(72) Inventors: Yoan Veyrac, Merignac (FR); Jérémy Inconstante, Merignac (FR); Patrick Garrec, Merignac (FR); Richard Montigny, Merignac (FR); Pascal Cornic, Brest (FR)

(73) Assignee: THALES, Courbevoie (FR)

( * ) Notice: Subject to any disclaimer, the term of this patent is extended or adjusted under 35 U.S.C. 154(b) by 407 days.

(21) Appl. No.: 16/708,194

(22) Filed: Dec. 9, 2019

(65) Prior Publication Data

US 2020/0256983 A1 Aug. 13, 2020

(30) Foreign Application Priority Data

Dec. 20, 2018 (FR) ...................................... 1873471

(51) Int. Cl.

| | | |
|---|---|---|
| *G01S 13/935* | (2020.01) | |
| *B64C 1/36* | (2006.01) | |
| *B64C 27/04* | (2006.01) | |
| *B64D 43/00* | (2006.01) | |
| *G01S 13/00* | (2006.01) | |
| *G08G 5/00* | (2006.01) | |
| *H01Q 3/34* | (2006.01) | |
| *H01Q 21/06* | (2006.01) | |
| *H01Q 25/00* | (2006.01) | |

(52) U.S. Cl.
CPC ............. *G01S 13/935* (2020.01); *B64C 1/36* (2013.01); *B64C 27/04* (2013.01); *B64D 43/00* (2013.01); *G01S 13/003* (2013.01); *G08G 5/0021* (2013.01); *H01Q 3/34* (2013.01); *H01Q 21/06* (2013.01); *H01Q 25/00* (2013.01)

(58) Field of Classification Search
CPC .......... B64C 1/36; B64C 27/04; B64D 43/00; G01S 13/003; G01S 13/48; G01S 13/933; G01S 13/935; G01S 7/032; G08G 5/0021; H01Q 21/06; H01Q 25/00; H01Q 3/34
See application file for complete search history.

(56) References Cited

U.S. PATENT DOCUMENTS

2005/0128126 A1* 6/2005 Wolframm .......... G01S 13/9023
342/250

FOREIGN PATENT DOCUMENTS

| DE | 100 36 131 A1 | 2/2002 |
|---|---|---|
| EP | 0 568 427 A1 | 11/1993 |
| EP | 2 293 101 A1 | 3/2011 |

\* cited by examiner

*Primary Examiner* — Timothy A Brainard
(74) *Attorney, Agent, or Firm* — BakerHostetler (57) ABSTRACT

A proximity radar method for a rotary-wing aircraft includes a sequence of phases T(k) of steps. In a first phase T(1), the electronic computer of the radar system computes unambiguous synthetic patterns on the basis of a first activated interferometric pattern M(1) of N unitary radiating groups. In the following phases T(k) of steps, executed successively in increasing order of k, the electronic computer computes synthetic patterns on the basis of interferometric patterns M(k) of rank k, wherein the N unitary radiating groups of a series deviate simultaneously in terms of azimuth and in terms of elevation as k increases, and establishes maps of rank k of the surroundings in terms of azimuth distance/direction and/or elevation distance/direction cells wherein the detected obstacle ambiguities, associated with the network lobes, are removed by virtue of the map(s) provided in the preceding phase or phases.

17 Claims, 6 Drawing Sheets

PROXIMITY RADAR METHOD AND SYSTEM FOR A ROTARY-WING AIRCRAFT

CROSS-REFERENCE TO RELATED APPLICATIONS

This application claims priority to foreign French patent application No. FR 1873471, filed on Dec. 20, 2018, the disclosure of which is incorporated by reference in its entirety.

FIELD OF THE INVENTION

The present invention relates to a proximity radar method and system for a rotary-wing aircraft.

The technical field of the invention is that of radar systems and use thereof for the detection of nearby obstacles and collision avoidance by helicopters and more generally by rotary-wing aircraft.

BACKGROUND

The context of the invention relates to navigation safety on board helicopters. The majority of helicopter accidents are caused by collisions that occur during take-off phases, landing phases, during static or low-speed flying, or else during movements close to obstacles such as cliffs or buildings. The risk is even greater when the environmental conditions are degraded and the visibility of the pilot is reduced thereby, for example due to night-time conditions, rain, fog or a dust cloud.

In order to significantly reduce the collision risk, there is thus a need for a device or system for detecting obstacles that operates regardless of the external conditions.

This device should be able to provide the crew with a panoramic view of the proximity, regardless of the optical visibility conditions, in order to be warned sufficiently early about a collision hazard.

This device should also be compatible with the demanding constraints in terms of its installation on the helicopter, this including requirements in terms of mass, consumption, bulk, positioning and cost.

Furthermore, the function performed by the device should have a very large coverage angle with a short enough refresh time to allow potential collision hazards to be anticipated as well as possible, in particular during maneuvers in the direct proximity of obstacles.

As is known, numerous technical solutions currently exist to address the problem of proximity detection.

A first technique is based on using GPS (global positioning system) data to locate the carrier, associated with a digital terrain map that locates potential obstacles. This solution has the advantage of using only a GPS receiver, which is moreover generally available. However, there are major drawbacks with the GPS system, such as the excessively coarse resolution and the excessively long positioning refresh time. Although these drawbacks are able to be overcome using data from the central navigation system, the drawback of poor robustness of the GPS system, which may be jammed or unavailable in some areas, remains. Moreover, this system is based on terrain models that are not necessarily up-to-date or that may lack accuracy. In particular, vehicles or temporary installations are not referenced therein, thereby causing a problem in terms of the reliability of the system when encountering these unlisted obstacles. Systems based on maps and using GPS positioning thus have weaknesses in terms of the integrity of the positioning and the exhaustiveness of the maps.

A second known technique consists in using laser sensors to perform optical mapping of the surroundings of the helicopter. This solution has the drawback of not working in conditions of reduced visibility, such as for example in foggy or rainy weather or else when facing the sun.

A third technique groups together radar sensor-based systems, making it possible to obtain a map even when optical visibility is poor.

Mechanical scanning radar-based systems do not make it possible to comply with the compromise of a short refresh time over a wide scanning field.

In static radar-based systems, a distinction is drawn between installations implementing electronic scanning radars, on the one hand, and installations based on the use of a large number of static radar sensors or detectors, on the other hand.

Electronic scanning-based systems perform mapping by scanning the peripheral space of the helicopter. When the desired collision avoidance application requires a very large angular coverage, the scanning image that is produced has a long refresh time, or else a short illumination time in each direction in space. The use of electronic scanning over a very large angular coverage is therefore difficult to reconcile with the requirement of the desired application, according to which a short refresh time and an illumination time that is as long as possible are required in order to benefit from an accurate measurement of the Doppler speed. It is recalled that measuring the Doppler speed makes it possible to obtain better mapping of the surroundings and to better identify and anticipate potential hazards.

Radar systems based on installing a large number of static sensors at the periphery of the helicopter make it possible to obtain continuous coverage of space. However, obtaining a fine angular resolution involves using a large number of sensors. The plurality of sensors has an impact on the price and the ease of installation and integration on the carrier. One alternative consists in using computational beamforming antennas. These antennas have a plurality of separate reception channels. It is then possible to emit and to receive in a large portion of space. Digitizing each of the individual reception channels makes it possible to form beams simultaneously, a posteriori, through digital processing. The compromise between the size of the field of coverage and the angular resolution of the system is reflected in the number of separate channels to be digitized and to be processed, this having an impact on the complexity and the cost of this solution in the first instance.

A first technical problem solved by the invention is that of reducing the complexity of a proximity radar method and system for a rotary-wing aircraft, the radar system covering a wide angular field to be monitored and having a fast refresh rate necessary for the system to be effective.

A second technical problem solved by the invention is that of reducing the number of radar sensors and of independent emission and/or reception channels of the proximity radar system for a rotary-wing aircraft, the radar system covering a wide angular field to be monitored and having a fast refresh rate necessary for the system to be effective.

A third technical problem solved by the invention is that of reducing the mass and the bulk and/or increasing the ease of integration of the proximity radar system for a rotary-wing aircraft, the radar system covering a wide angular field to be monitored and having a fast refresh rate necessary for the system to be effective.

SUMMARY OF THE INVENTION

To this end, one subject of the invention is a proximity radar method for a rotary-wing aircraft, implemented by a proximity radar system comprising at least one radar sensor having: an antenna panel, formed of a whole number N, greater than or equal to 2, of reception sectors and at least one emission sector; and N reception channels, configured so as to independently demodulate and then respectively digitize the N reception sectors; and an emission channel, configured so as to modulate a radar emission waveform on a radar carrier to be emitted by the at least one emission sector; and an electronic computer configured so as to implement proximity radar processing operations and to fuse direction/distance map data; and a display for displaying the proximity situation of the aircraft; the N reception sectors being distributed around a predetermined common central point O; and each of the N reception sectors having one and the same number NK, greater than or equal to 2, of unitary radiating groups whose position in terms of azimuth and/or in terms of elevation varies between the central point O and the periphery of their sector, and pointing in one and the same pointing direction with an identical radiation pattern.

The proximity radar method comprises a sequence of phases T(k) of steps, executed successively as a function of k, k varying from 1 to NK, wherein: each phase T(k) of steps consists in the electronic computer activating, with an interferometric pattern M(k) associated with the rank k, at a rate of one radiating group per reception sector, N active radiating groups associated with said interferometric pattern M(k), whose position in terms of azimuth and/or in terms of elevation varies as a function of the temporal rank k between the central point O and the periphery of their sector without passing through one and the same position again, so as to produce, in correlation, synthetic patterns during computational reception beamforming with a lobe width and the appearance of a number of network lobes that vary as a function of the temporal rank k, and so as to establish a map of rank k of the surroundings in terms of azimuth distance/direction and/or elevation distance/direction cells in which the detected obstacle ambiguities, associated with the network lobes, are removed by virtue of the map(s) provided in the phase or phases preceding and/or following the phase T(k).

According to particular embodiments, the proximity radar method comprises one or more of the following features, taken alone or in combination:

the N reception sectors are distributed angularly around a predetermined common central point O; and each of the N reception sectors has one and the same number NK, greater than or equal to 2, of unitary radiating groups that deviate in terms of azimuth and/or in terms of elevation toward the periphery of their sector, and pointing in one and the same pointing direction with an identical radiation pattern; and the sequence of phases T(k) of steps of the proximity radar method, k varying from 1 to NK, is characterized in that: in a first phase T(1), the electronic computer activates, with a first interferometric pattern M(1), at a rate of one active radiating group per reception sector, N active radiating groups that are closest to the common central point O of the reception sectors, so as to obtain unambiguous synthetic patterns during computational reception beamforming; and then, in the following phases T(k) of steps, executed successively in increasing order of k, for k varying from 2 to NK, the phase T(k) of steps consists in the electronic computer activating, with an interferometric pattern M(k) associated with the rank k, at a rate of one radiating group per reception sector, N active radiating groups associated with said pattern M(k), deviating more in terms of azimuth and/or in terms of elevation the greater the temporal rank k, so as to produce, in correlation, synthetic patterns during computational reception beamforming with a lobe width half that of the lobes of the preceding pattern M(k−1), and the appearance of a number of network lobes equal to 2 times 2k−1, and so as to establish a map of rank k of the surroundings in terms of azimuth distance/direction and/or elevation distance/direction cells in which the detected obstacle ambiguities, associated with the network lobes, are removed by virtue of the map(s) provided in the phase or phases preceding the phase T(k);

for each phase T(k) of steps, k varying from 1 to NK, the electronic computer executes a first step, a second step and a third step; the first step, executed in the phase T(k), consisting in the electronic computer activating N unitary radiating groups associated with an interferometric pattern M(k), wherein, for k equal to 1, the first pattern M(1) is formed of the N active radiating groups, at a rate of one active radiating group per reception sector, that are closest to the common central point O of the reception sectors, and for k between 2 and NK, the pattern of order k, M(k), is formed of the closest adjacent N active radiating groups, at a rate of one active radiating group per reception sector, that deviate simultaneously in terms of azimuth and in terms of elevation from the active radiating groups of the preceding pattern M(k−1); and the signals received by the N reception sectors associated with the pattern M(k) are demodulated and digitized independently on the corresponding digitized channels and supplied to the electronic computer; and the second step, executed in the phase T(k), k being between 1 and NK, consisting in two synthetic beams being formed through computation by the electronic computer on the basis of the signals from the N demodulated and digitized sectors by combining said N signals from the reception sectors by suitable phase-shifting operations, 2*(2k−1) network lobes being created in said synthetic beams starting from a rank k equal to 2; and the third step, executed in the phase T(k), consisting in the computer establishing, on the basis of the synthetic beams computed for the pattern M(k) of rank k, a map of rank k of the surroundings in terms of azimuth distance/direction cells expressed as a direction cosine and/or elevation distance/direction cells expressed as a direction and direction/distance cosine and fusing the map of rank k with the map of preceding rank k−1 when k is greater than or equal to 2 in order to remove possible detected obstacle ambiguities;

the proximity radar method defined above furthermore comprises a display step executed after the third step of each phase T(k) starting from a predetermined rank k greater than or equal to 2, wherein the display is configured so as to display the proximity situation of the aircraft, to highlight approaching hazards and warnings;

at least one emission sector is contained within the reception sectors and the proximity radar operates in a monostatic mode; or at least one emission sector is separate and remote from the reception sectors and the proximity radar operates in a bistatic mode;

when the radar operates in a bistatic mode, at least one unitary emission radiating group, configured so as to point in the same pointing direction as that of the unitary radiating groups of the reception sectors and having the same radiation pattern, is activated statically; and/or at least two unitary emission radiating groups configured so as to point in the same pointing direction as that of the unitary radiating groups of reception sectors and having the same radiation pattern are activated dynamically, by making the activation of the active radiating groups circulate so as to follow at least one circulation vector.

Another subject of the invention is a proximity radar system for a rotary-wing aircraft comprising at least one radar sensor having: an antenna panel, formed of a whole number N, greater than or equal to 2, of reception sectors and at least one emission sector; and N reception channels, configured so as to independently demodulate and then respectively digitize the N reception sectors; and an emission channel, configured so as to modulate a radar emission waveform on a radar carrier to be emitted by the at least one emission sector; an electronic computer configured so as to implement proximity radar processing operations and to fuse direction/distance map data; and a display for displaying the proximity situation of the aircraft; the N reception sectors being distributed around a predetermined common central point O; and each of the N reception sectors having one and the same number NK, greater than or equal to two, of unitary radiating groups whose position in terms of azimuth and/or in terms of elevation varies between the central point O and the periphery of their sector, and pointing in one and the same pointing direction with an identical radiation pattern.

The electronic computer is configured so as to implement a proximity radar method by executing a sequence of phases T(k) of steps, k varying from 1 to NK, wherein each phase T(k) of steps consists in the electronic computer activating, with an interferometric pattern M(k) associated with the rank k, at a rate of one radiating group per reception sector, N active radiating groups associated with said interferometric pattern M(k), whose position in terms of azimuth and/or in terms of elevation varies as a function of the temporal rank k, so as to produce, in correlation, synthetic patterns during computational reception beamforming with a lobe width and the appearance of a number of network lobes that vary as a function of the temporal rank k, and so as to establish a map of rank k of the surroundings in terms of azimuth distance/direction and/or elevation distance/direction cells in which the detected obstacle ambiguities, associated with the network lobes, are removed by virtue of the map(s) provided in the phase or phases preceding and/or following the phase T(k).

According to particular embodiments, the proximity radar system comprises one or more of the following features, taken alone or in combination:

the N reception sectors are distributed angularly around a predetermined common central point O; and each of the N reception sectors having one and the same number NK, greater than or equal to two, of unitary radiating groups that deviate in terms of azimuth and/or in terms of elevation toward the periphery of their sector, pointing in one and the same pointing direction with an identical radiation pattern; and the sequence of phases T(k) of steps, k varying from 1 to NK, is implemented by starting with a first phase T(1) in which the computer activates, with a first interferometric pattern M(1), at a rate of one active radiating group per reception sector, N active radiating groups that are closest to the common central point O of the reception sectors, so as to obtain unambiguous synthetic patterns during computational reception beamforming; and then by successively executing, for k varying from 2 to NK, the phases T(k), the phase T(k) of steps consisting in the electronic computer activating, with an interferometric pattern M(k) associated with the rank k, at a rate of one radiating group per reception sector, N active radiating groups associated with said pattern M(k), deviating more in terms of azimuth and/or in terms of elevation the greater the temporal rank k, so as to produce, in correlation, synthetic patterns during computational reception beamforming with a lobe width half that of the lobes of the preceding pattern M(k−1), and the appearance of a number of network lobes equal to 2 times 2k−1, and so as to establish a map of the surroundings in terms of azimuth distance/direction and/or elevation distance/direction cells in which the detected obstacle ambiguities, associated with the network lobes, are removed by virtue of the map(s) provided in the phase or phases preceding the phase T(k);

each unitary radiating group of the N reception sectors is formed of a single radiating element, all of the radiating elements of the N reception sectors having an identical radiation pattern; or each unitary radiating group of the N reception sectors is formed of one of the same number NJ, greater than or equal to 2, of radiating elements, the radiating elements being spaced from one another by less than one wavelength λ of the radar carrier;

each unitary radiating group of the N reception sectors is formed of one and the same number NJ, greater than or equal to 2, of radiating elements, the radiating elements being spaced from one another by less than one wavelength λ of the radar carrier, and all of the unitary radiating groups are oriented identically on the antenna panel; and the radiating elements forming each unitary radiating group are phase-shifted from one another by one and the same network of phase shifters, connected in parallel to one and the same summing circuit, of the channel of the reception sector to which the unitary radiating group belongs; each unitary radiating group of the N reception sectors is formed of two radiating elements, spaced from one another by less than one wavelength λ of the radar carrier, and aligned with one another on the antenna panel along its axis of elevation; and the two radiating elements forming each unitary radiating group are phase-shifted from one another by one and the same angle Δα such that all of the radiating groups point in one and the same direction having a non-zero elevation angle and a zero azimuth angle;

the NK unitary radiating groups of each reception sector are positioned regularly and substantially along the bisector of said reception sector, starting from an area close to the central point O and going toward the periphery of said reception sector;

at least one emission sector is contained within the reception sectors and the proximity radar system is monostatic; or at least one emission sector is separate and remote from the reception sectors and the proximity radar system is bistatic; the radar system is bistatic; and at least one unitary emission radiating group, configured so as to point in the same pointing direction as that of the unitary radiating groups of the reception sectors and having the same radiation pattern, is or are activated statically; and/or at least two unitary emission radiating groups, configured so as to point in the same pointing direction as that of the unitary radiating groups of the reception sectors and having the same radiation pattern, are activated dynamically, by making the activation of the active radiating groups circulate so as to follow at least one circulation vector;

the electronic computer is configured so as to execute, in each phase T(k) of steps, k varying from 1 to NK, a first step, a second step and a third step; the first step, executed in the phase T(k), consisting in the electronic computer activating N unitary radiating groups associated with an interferometric pattern M(k), wherein, for k equal to 1, the first pattern M(1) is formed of the N active radiating groups, at a rate of one active radiating group per reception sector, that are closest to the common central point O of the reception sectors, and for k between 2 and NK, the pattern of order k, M(k), is formed of the closest adjacent N active radiating groups, at a rate of one active radiating group per reception sector, that deviate in terms of azimuth and/or in terms of elevation from the active radiating groups of the preceding pattern M(k−1); and the signals received by the N reception sectors associated with the pattern M(k) are demodulated and digitized independently on the corresponding digitized channels and supplied to the electronic computer; and the second step, executed in the phase T(k), k being between 1 and NK, consisting in two synthetic beams being formed through computation by the electronic computer on the basis of the signals from the N demodulated and digitized sectors by combining said N signals from the reception sectors by suitable phase-shifting operations, 2*(2k−1) network lobes being created in said synthetic beams starting from a rank k equal to 2; and the third step, executed in the phase T(k), consisting in the computer establishing, on the basis of the synthetic beams computed for the pattern M(k) of rank k, a map of rank k of the surroundings in terms of azimuth distance/direction cells expressed as a direction cosine and/or elevation distance/direction cells expressed as a direction and direction/distance cosine and fusing the map of rank k with the map of preceding rank k−1 when k is greater than or equal to 2 in order to remove possible detected obstacle ambiguities;

the display is configured so as to display the proximity situation of the aircraft, highlight approaching hazards and warnings;

the proximity radar system defined above comprises three identical radar sensors, positioned around the carrier of the aircraft so as to form a protective bubble for the carrier.

BRIEF DESCRIPTION OF THE DRAWINGS

The invention will be better understood upon reading the following description of several embodiments, this description being given solely by way of example and with reference to the drawings, in which.

DETAILED DESCRIPTION

A proximity radar system according to the invention for a rotary-wing aircraft, such as for example a helicopter, is based on a dynamic change of the synthetic reception radiation pattern of the radar. This technique is based on modifying the mapping of the radiating elements that are activated over time. This makes it possible to successively access a plurality of maps, starting from a coarse angular resolution and without ambiguities, moving toward a finer angular resolution but with network ambiguities. Combining the successive maps obtained by computational beamforming gives access to the fine angular resolution while at the same time removing ambiguities. This technique makes it possible to continuously illuminate and process the complete field of coverage, with a low number of reception channels.

The proximity radar system according to the invention thus makes it possible to cover a wide angular field with a short refresh time, while at the same time ensuring a long illumination time in order to perform effective Doppler processing.

Figure 1:
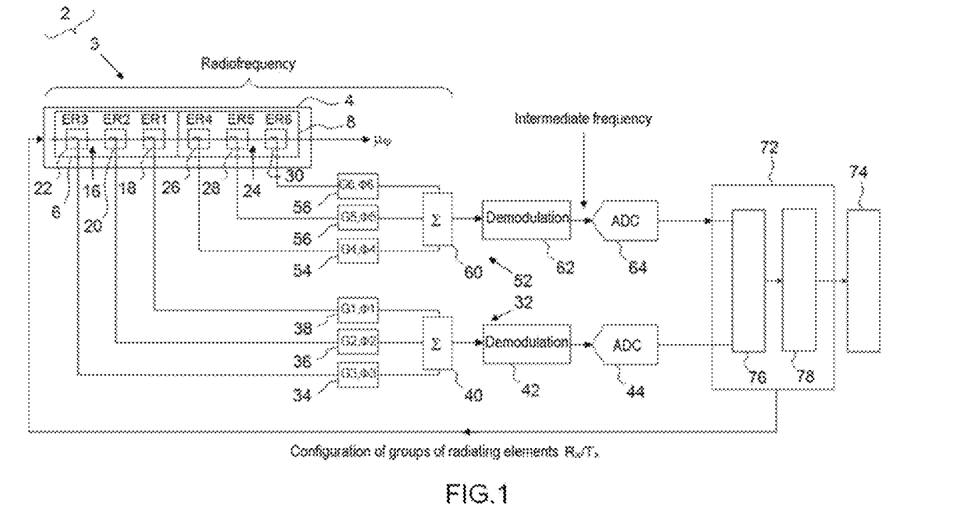
FIG. 1 is a view of the architecture of a proximity radar system according to a first embodiment of the invention.

According to FIG. 1 and a first embodiment of a proximity radar system according to the invention, given by way of example in order to illustrate the invention in a simple manner, a proximity radar system 2 comprises a radar sensor 3 having an antenna panel 4 in this case forming a transceiver radar antenna that has two separate reception sectors 6, 8 that are adjacent to one another and each extend along an azimuthal axis $u_\varphi$ of the antenna 4. The first reception sector 6, situated to the left in FIG. 1, is denoted "left-hand sector", whereas the second reception sector 8, situated to the right in FIG. 1, is denoted "right-hand sector".

The left-hand reception sector 6 has a first set 16 of radiating elements, in this case three radiating elements 18, 20, 22, denoted ER1, ER2, ER3 from right to left in FIG. 1.

The right-hand reception sector 8 has a second set 24 of radiating elements, in this case three radiating elements 26, 28, 30, denoted ER4, ER5, ER6 from left to right in FIG. 1.

Each radiating element is considered here to be a unitary radiating group, in this case limited to a single unitary element.

Generally speaking, a unitary radiating group is a small set of one and the same predetermined non-zero whole number NJ of radiating elements, arranged in one and the same predetermined pattern and locally covering an area that is smaller in comparison with the size of a sector, the radiating elements of the unitary radiating group being spaced from one another by less than one wavelength of the radar carrier.

Unitary radiating groups with two radiating elements (NJ equal to 2) will be contemplated below for a second embodiment of the proximity radar system, and an explanation of the definition of the unitary radiating group will be provided.

Each radiating element of one and the same reception sector is able to be activated, for example by turning on/turning off its power supply or any other means, and connected to an analog summing circuit through an amplification/attenuation and/or phase shift circuit.

The reception sensor 3 has a first left-hand digitization channel 32 for the left-hand sector 6 having three controllable left-hand amplification/attenuation and phase shift analog circuits 34, 36, 38, a left-hand radiofrequency summing circuit 40, an intermediate-frequency left-hand demodulator 42, and a left-hand analog-to-digital ADC conversion circuit 44.

The radiating elements ER1, ER2, ER3 of the left-hand reception sector 6 are connected, via three inputs, to the left-hand radiofrequency summing circuit 40, respectively through controllable left-hand amplification/attenuation and phase shift analog circuits 34, 36 and 38.

The intermediate-frequency left-hand demodulator 42 is connected between the left-hand radiofrequency summing circuit 40, positioned upstream toward the left-hand reception sector 6, and the left-hand analog-to-digital ADC conversion circuit 44.

The reception sensor 3 has a second right-hand digitization channel 52 for the right-hand sector 8 having three controllable right-hand amplification/attenuation and phase shift analog circuits 54, 56, 58, a right-hand radiofrequency summing circuit 60, an intermediate-frequency right-hand demodulator 62, and a right-hand analog-to-digital ADC conversion circuit 64.

The radiating elements ER4, ER5, ER6 of the right-hand reception sector 8 are connected, via three inputs, to the right-hand radiofrequency summing circuit 60, respectively through controllable right-hand amplification/attenuation and phase shift analog circuits 54, 56 and 58.

The intermediate-frequency right-hand demodulator 62 is connected between the right-hand radiofrequency summing circuit 60, positioned upstream toward the right-hand reception sector 8, and the right-hand analog-to-digital ADC conversion circuit 64.

The reception sensor 3 has an electronic computer 72 for radar processing operations and data fusion, making it possible to detect obstacles and collision hazards, and a display 74.

The electronic computer 72 has a first module 76 for radar processing operations and a second module 78 for data fusion.

The first module 76 is configured so as to implement computational reception beamforming, distance filtering and Doppler filtering.

The second module 78 is configured so as to establish and fuse direction/distance maps.

The display 74 is configured so as to display the proximity situation of the aircraft and highlight approaching hazards and warnings.

Figure 2:
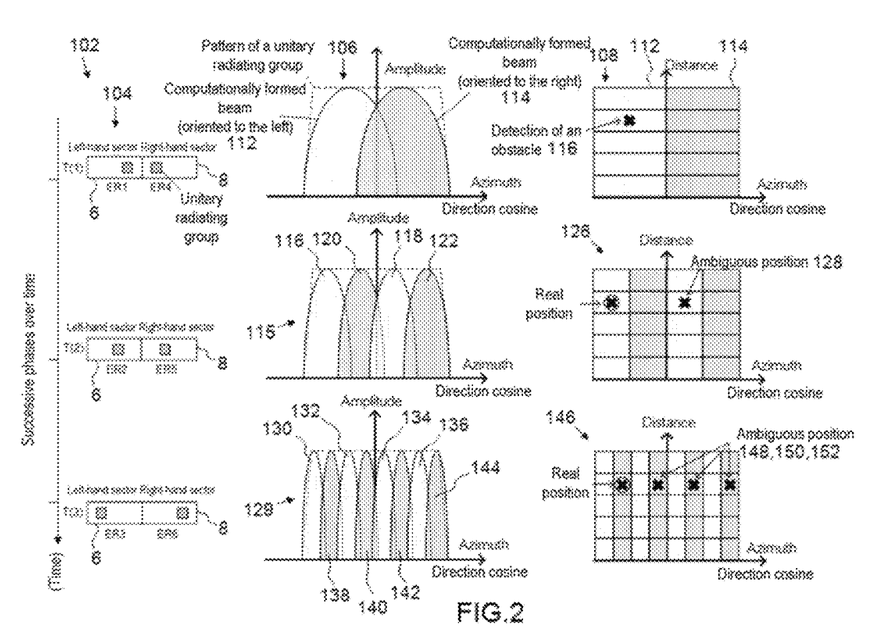
FIG. 2 is a view of a proximity radar method according to a first embodiment of the invention, implemented by the proximity radar system of FIG. 1.

According to FIG. 2, a proximity radar method 102 according to a first embodiment of the invention, implemented by the proximity radar system of FIG. 1, comprises a set of temporal phases that are run through successively in increasing integer order rank, in this case three phases denoted T(1), T(2), T(3), of activating unitary radiating groups at a rate of one unitary radiating group per reception sector of the reception antenna and per phase, with a geometrically distributed pattern around the central point O of the reception antenna, in this case along an azimuthal axis, the distance to the central point O and the mutual deviation between the unitary radiating groups of one and the same pattern increasing when the order of the temporal phase increases.

In the phase T(1), in a first step 104, the radar signals received by the two separate left-hand and right-hand sectors of the reception antenna are digitized independently and respectively on the first and second digitized channels.

The unitary radiating group 18, formed in this case by the radiating element ER1 and associated with the left-hand reception sector, and the unitary radiating group 26, formed in this case by the radiating element ER4, are both active and form the first pattern of the first phase T(1).

The radiation pattern of each unitary radiating group ER1, ER4 is identical, and it covers a wide angular field.

After digitization, in a second step 106, the received patterns from the unitary radiating groups ER1 and ER4 are combined for computational beamforming. In the first phase T(1), the pattern resulting from the two combined sectors is a wide beam. Depending on the relative phase shift applied to the two channels, the resulting beam may be oriented. It is therefore possible to form, in parallel, two separate wide beams 112, 114, respectively to the left and to the right of the field of coverage.

For each of the two beams 112, 114, in a third step 108, a certain number of distance cells are plotted, the size of which depends on the bandwidth of the radar signal that is used, in this case five cells per beam. The intensity of the feedback in each of these cells and for each of these beams makes it possible to detect potential obstacles with a coarse angular resolution, in this case a detected obstacle 116 in the fourth distance cell of the left-hand beam.

Then, in the second phase T(2), the first activation pattern is replaced with a second activation pattern in which the unitary radiating group 20, formed in this case by the radiating element ER2 and associated with the left-hand reception sector, and the unitary radiating group 28, formed in this case by the radiating element ER5, are both active. The first, second and third steps 104, 106, 108 are then applied using this second pattern in which the radiating elements ER2 and ER5 are more spaced. A second resulting pattern is obtained at the output of the second step 106, in which two lobes 116, 118 of a first beam oriented to the left and two lobes 120, 122 of a second beam oriented to the right are interleaved, thereby making it possible to refine the angular detection resolution of the proximity radar system. In the third step 108, a second map 126 of the surroundings is obtained, in which the ambiguities associated with the network lobes, in this case a single ambiguous position 128, is removed by virtue of the first map determined in the third step of the first phase T(1).

Next, in the third phase T(3), the second activation pattern is replaced with a third activation pattern in which the unitary radiating group 22, formed in this case by the radiating element ER3 and associated with the left-hand reception sector 6, and the unitary radiating group 30, formed in this case by the radiating element ER6, are both active. The first, second and third steps 104, 106, 108 are then applied again using this third pattern in which the radiating elements ER3 and ER6 are even more spaced. A third resulting pattern 129 is obtained at the output of the second step 106, in which four lobes 130, 132, 134, 136 of a first beam, oriented to the left, and four lobes 138, 140, 142, 144 of a second beam, oriented to the right, are interleaved, thereby making it possible to refine the angular detection resolution of the proximity radar system. In the third step 108, a third map 146 of the surroundings is obtained, in which the ambiguities associated with the network lobes, in this case three ambiguous positions 148, 150, 152, are removed by virtue of the first and second maps determined in the first and second phases T(1), T(2).

Thus, by using a lower number of interferometric patterns on the reception antenna of the radar system 2 and by using computational beamforming, the proximity radar method 102 according to the invention manages to refine the angular resolution of the proximity radar system as it runs through a limited number of activation phases, and to remove the ambiguities, associated with the network lobes, that are created by virtue of the maps that are established in the preceding phases.

A plurality of radar sensors may be positioned around the carrier in order to obtain the desired field of coverage. As each panel is able to process wide angular sectors, theoretically up to one half-space for a flat panel, the number of sensors to be installed remains low.

Some applications or flight phases require slightly more restricted angular coverage. Preference may for example be given to upward coverage in order to avoid a collision of the rotor blades, this preferably being used in virtually stationary phases. By contrast, the landing phase requires more coverage toward the ground. In order to improve the mapping performances in these particular cases, the field of coverage may be restricted by modifying the topology of the unitary radiating group.

Figure 3:
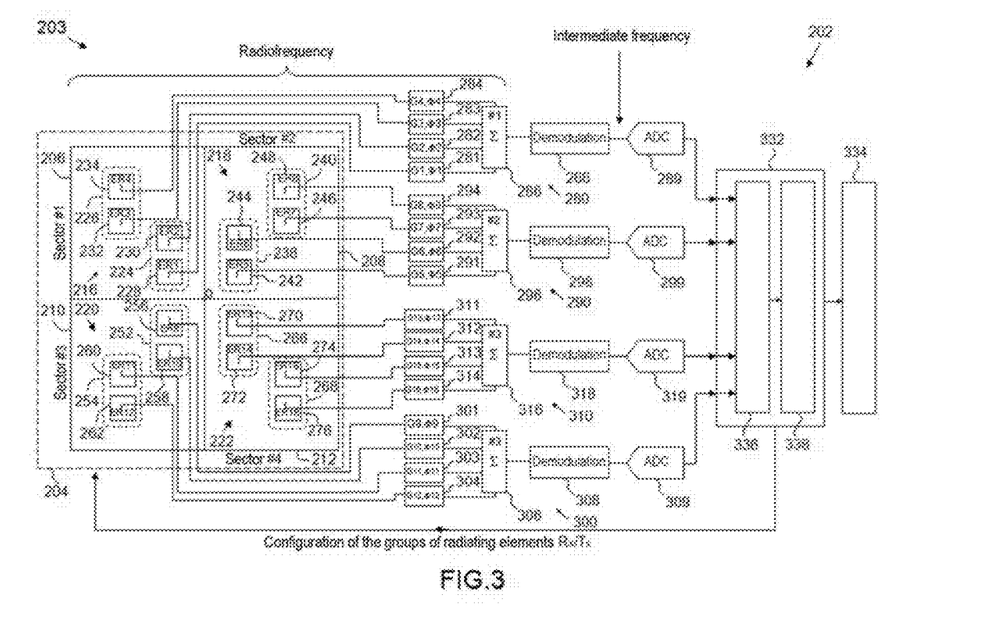
FIG. 3 is a view of the architecture of a proximity radar system according to a second embodiment.

According to FIG. 3 and a second embodiment of a proximity radar system according to the invention, a proximity radar system 202 comprises a radar sensor 203 having an antenna panel 204 in this case forming a transceiver radar antenna that has four separate reception sectors 206, 208, 210, 212 that are distributed angularly around a central point and each extend along an azimuthal direction $u_\varphi$ and an elevation direction $u_\theta$.

A first reception sector 206, a second reception sector 208, a third reception 210 and a fourth reception sector 212, which are situated respectively at the top left, at the top right, at the bottom left and at the bottom right with respect to the central point O of the antenna panel 204 in FIG. 3, are respectively denoted "sector 1", "sector 2", "sector 3" and "sector 4".

The first, second, third and fourth reception sectors 206, 208, 210, 212 respectively have first, second, third and fourth separate sets 216, 218, 220, 222 of radiating elements.

The first reception sector 206 in this case comprises four radiating elements 228, 230, 232, 234, respectively denoted ER1, ER2, ER3, ER4, in this case grouped into two unitary radiating groups 224, 226, each illustrated by a dotted contour.

A first unitary radiating group Gr1 226 groups together the two radiating elements ER1, ER2, whereas a second unitary radiating group Gr2 226 groups together the two radiating elements ER3, ER4.

The first and second unitary radiating groups 224, 226, which are separate from one another, are positioned along a first centrifugal trajectory that deviates from the central point O in terms of azimuth and in terms of elevation toward the upper left-hand corner of the first sector 206 in FIG. 3.

The second reception sector 208 in this case comprises four radiating elements 242, 244, 246, 248, respectively denoted ER5, ER6, ER7, ER8, in this case grouped into two unitary radiating groups 238, 240, each illustrated by a dotted contour.

A third unitary radiating group Gr3 238 groups together the two radiating elements ER5, ER6, whereas a fourth unitary radiating group Gr4 240 groups together the two radiating elements ER7, ER8.

The third and fourth unitary radiating groups 238, 240, which are separate from one another, are positioned along a second centrifugal trajectory that deviates from the central point O in terms of azimuth and in terms of elevation toward the upper right-hand corner of the second sector 208 in FIG. 3.

The third reception sector 210 in this case comprises four radiating elements 256, 258, 260, 262, respectively denoted ER9, ER10, ER11, ER12, in this case grouped into two unitary radiating groups 252, 254, each illustrated by a dotted contour.

A fifth unitary radiating group Gr5 252 groups together the two radiating elements ER9, ER10, whereas a sixth unitary radiating group Gr6 254 groups together the two radiating elements ER11, ER12.

The fifth and sixth unitary radiating groups 252, 254, which are separate from one another, are positioned along a third centrifugal trajectory that deviates from the central point O in terms of azimuth and in terms of elevation toward the lower left-hand corner of the third sector 210 in FIG. 3.

The fourth reception sector 212 in this case comprises four radiating elements 270, 272, 274, 276, respectively denoted ER13, ER14, ER15, ER16, in this case grouped into two unitary radiating groups 266, 268, each illustrated by a dotted contour.

A seventh unitary radiating group Gr7 266 groups together the two radiating elements ER13, ER14, whereas an eighth unitary radiating group Gr8 268 groups together the two radiating elements ER15, ER16.

The seventh and eighth unitary radiating groups 266, 268, which are separate from one another, are positioned along a fourth centrifugal trajectory that deviates from the central point O in terms of azimuth and in terms of elevation toward the lower right-hand corner of the fourth sector 212 in FIG. 3.

It is recalled that, generally speaking, a unitary radiating group is a small set of one and the same predetermined non-zero whole number NJ of radiating elements, arranged in one and the same predetermined pattern and locally covering an area that is smaller in comparison with the size of a sector, the radiating elements of the unitary radiating group being spaced from one another by less than one wavelength of the radar carrier.

In this case, in FIG. 3, unitary radiating groups with two radiating elements (NJ equal to 2) are considered for the second embodiment of the proximity radar system.

Figure 4:
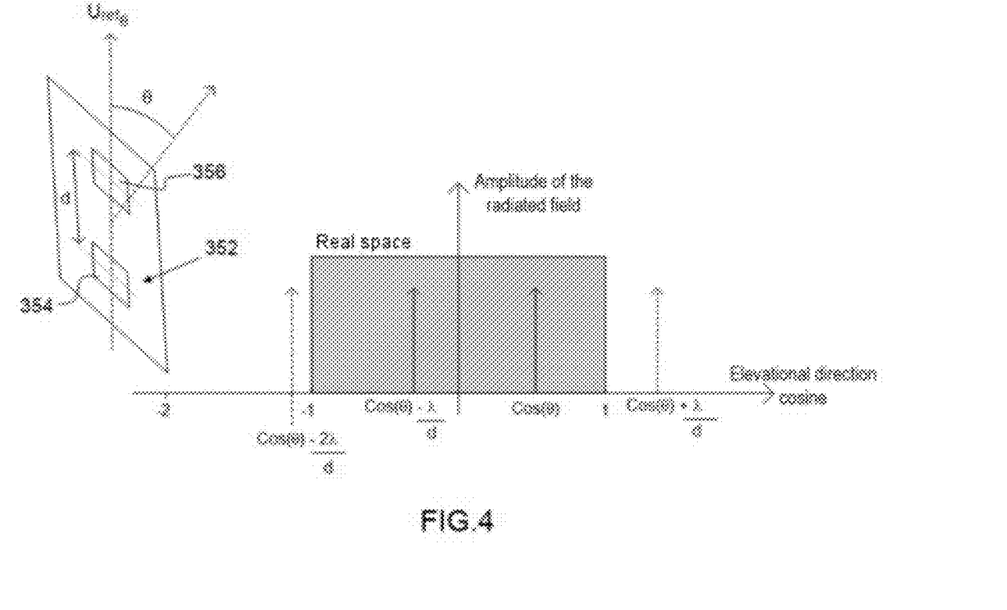
FIG. 4 is an explanatory view of the general architecture of a unitary radiating group.

According to FIG. 4, the behavior of a unitary radiating group having at least two radiating elements, in this case aligned along an elevational θ pointing axis $U_{ref\theta}$, is analyzed in terms of the appearance of network lobes in the real space when the ratio of the wavelength λ of the carrier of the radar to the spacing d between two immediately adjacent radiating elements varies. The analysis performed here for a unitary radiating group 352 with two radiating elements 354, 356 remains valid for a unitary radiating group having a number G of radiating elements strictly greater than 2.

As the elevational pointing direction is assumed to be given by the angle (θ), the effective network lobes are those that appear in the real space are situated at cos(θ)+k*λ/d, k being a relative whole number.

If the radiating elements are spaced by a distance d less than λ, there are no network lobes in the real space for pointing to the normal of the antenna, that is to say θ=π/2 or cos(θ)=0, but a lobe appears when B is other than 0.

If the radiating elements are spaced by a distance d less than λ/2, there are no network lobes in the real space, this being the case regardless of the value of θ.

It is thus assumed in the present invention that, when a unitary radiating group is formed of at least two radiating elements, the latter are spaced from one another by less than one wavelength λ of the radar carrier, so as to avoid the presence of network lobes when the pointing θ is to the normal of the radar antenna, this being the nominal case when it is desired to illuminate the entire surrounding space.

Returning to FIG. 3, each radiating element of the reception sectors 206, 208, 210, 212 is able to be activated, for example by turning on/turning off its power supply or any other means, and connected to an analog summing circuit through an amplification/attenuation and/or phase shift circuit.

The reception sensor 203 has a first digitization channel 280 for the first sector 206 having four first controllable amplification/attenuation and phase shift analog circuits 281, 282, 283, 284, a first radiofrequency summing circuit 286, a first intermediate-frequency demodulator 288, and a first analog-to-digital ADC conversion circuit 289.

The radiating elements ER1, ER2, ER3, ER4 of the first reception sector 206 are connected, via four first inputs, to the first radiofrequency summing circuit 286, respectively through the first controllable amplification/attenuation and phase shift analog circuits 281, 282, 283, 284.

The first intermediate-frequency demodulator 288 is connected between the first radiofrequency summing circuit 286, positioned upstream toward the first reception sector 206, and the first analog-to-digital ADC conversion circuit 289.

The reception sensor 203 has a second digitization channel 290 for the second sector 208 having four second controllable amplification/attenuation and phase shift analog circuits 291, 292, 293, 294, a second radiofrequency summing circuit 296, a second intermediate-frequency demodulator 298, and a second analog-to-digital ADC conversion circuit 299.

The radiating elements ER5, ER6, ER7, ER8 of the second reception sector 208 are connected, via four second inputs, to the second radiofrequency summing circuit 296, respectively through the second controllable amplification/attenuation and phase shift analog circuits 291, 292, 293, 294.

The second intermediate-frequency demodulator 298 is connected between the second radiofrequency summing circuit 296, positioned upstream toward the second reception sector 208, and the second analog-to-digital conversion circuit 299.

The reception sensor 203 has a third digitization channel 300 for the third sector 210 having four third controllable amplification/attenuation and phase shift analog circuits 301, 302, 303, 304, a third radiofrequency summing circuit 306, a third intermediate-frequency demodulator 308, and a third analog-to-digital ADC conversion circuit 309.

The radiating elements ER9, ER10, ER11, ER12 of the third reception sector 210 are connected, via four third inputs, to the third radiofrequency summing circuit 306, respectively through the third controllable amplification/ attenuation and phase shift analog circuits 301, 302, 303, 304.

The third intermediate-frequency demodulator 308 is connected between the third radiofrequency summing circuit 306, positioned upstream toward the third reception sector 210, and the third analog-to-digital conversion circuit 309.

The reception sensor 203 has a fourth digitization channel 310 for the fourth sector 212 having four fourth controllable amplification/attenuation and phase shift analog circuits 311, 312, 313, 314, a fourth radiofrequency summing circuit 316, a fourth intermediate-frequency demodulator 318, and a fourth analog-to-digital ADC conversion circuit 319.

The radiating elements ER13, ER14, ER15, ER16 of the fourth reception sector 212 are connected, via four fourth inputs, to the fourth radiofrequency summing circuit 316, respectively through the fourth controllable amplification/ attenuation and phase shift analog circuits 311, 312, 313, 314.

The fourth intermediate-frequency demodulator 318 is connected between the fourth radiofrequency summing circuit 316, positioned upstream toward the fourth reception sector 212, and the fourth analog-to-digital conversion circuit 319.

The reception sensor 203 has an electronic computer 332 for radar processing operations and data fusion, making it possible to detect obstacles and collision hazards, and a display 334.

The electronic computer 332 is connected to the respective outputs of first, second, third and fourth digitized channels 280, 290, 300, 310, and it is also connected, via a link 335 for activating the unitary radiating groups, to the antenna panel 204 in order to transmit activation commands for the radiating groups of the reception and emission sectors depending on predetermined activation phases.

The electronic computer 332 has a first module 336 for radar processing operations and a second module 338 for data fusion.

The electronic computer 332 is configured so as to command the activation of the radiating groups of the reception and emission sectors depending on predetermined activation phases.

The first module 336 is configured so as to implement computational reception beamforming, distance filtering and Doppler filtering.

The second module 338 is configured so as to establish and fuse direction/distance maps.

The display 334 is configured so as to display the proximity situation of the aircraft and highlight approaching hazards and warnings.

Figure 5:
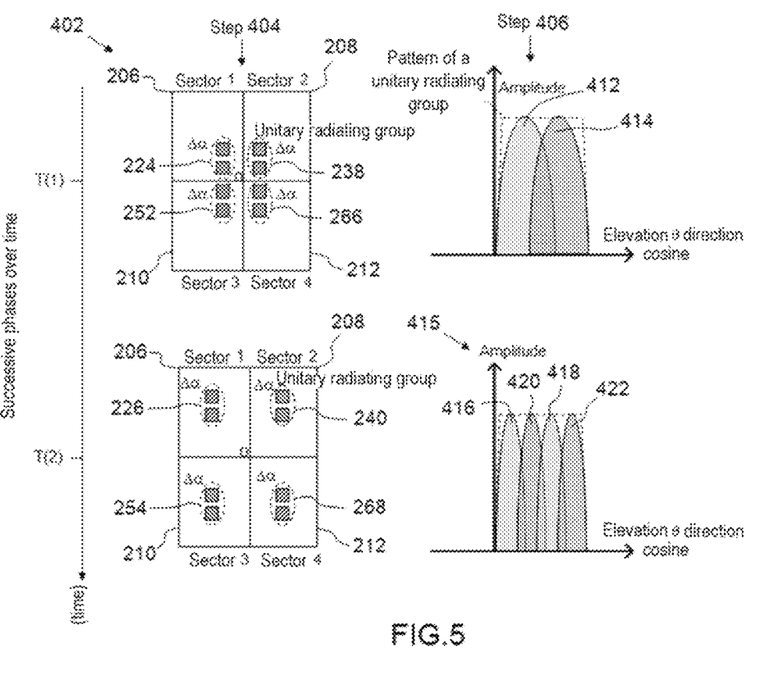
FIG. 5 is a view of a proximity radar method according to a second embodiment of the invention, implemented by the proximity radar system of FIG. 3.

According to FIG. 5, a proximity radar method 402 according to a second embodiment of the invention, implemented by the proximity radar system of FIG. 3, in this case comprises a set of two temporal phases T(1), T(2) of activating unitary radiating groups at a rate of one unitary radiating group per reception sector of the reception antenna and per phase, with a different geometrically distributed pattern, associated with each phase, around the central point O of the reception antenna, in this case along an azimuthal axis and along an elevational axis, the distance to the central point O and the mutual deviation between the unitary radiating groups of one and the same pattern increasing when the order of the temporal phase increases.

In this case, in a particular manner, for each unitary radiating group, a combination of the two radiating elements, forming the unitary radiating group and aligned in the direction given by the elevational axis $u_\theta$, is performed at the radiofrequency level before the demodulation and the digitization. For each unitary radiating group, one and the same phase shift $\Delta\alpha$ is applied between the two radiating elements of said group at the radiofrequency level, such that the resulting pattern is oriented in a given particular direction. A positive phase shift Δα brings about an upwardly oriented radiation pattern as described in FIG. 5.

It should be noted that a similar phase shift is also applied to the radiating elements at emission. The radiating elements at emission are those of at least one emission sector and may be those of one or more of the reception sectors in the case of a monostatic proximity radar with a transceiver antenna. In this case, the at least one emission sector is contained within the reception sectors.

The radiating elements at emission may also, as an alternative and preferably, be those of at least one emission sector that is separate and remote from the reception sectors, in the case of a bistatic radar with an emission antenna and a reception antenna that are separate so as to perform continuous emission/reception.

In the phase T(1), in a first step 404, the radar signals received by the first, second, third and fourth reception sectors are digitized independently and respectively on the first, second, third and fourth digitized channels.

The first, third, fifth and seventh unitary radiating groups 224, 238, 252, 266 are active and form the first pattern of the first phase T(1).

The radiation pattern of each unitary radiating group is identical, and it covers a wide angular field.

After digitization, in a second step 406, the received patterns from the unitary radiating groups 224, 238, 252, 266 are combined for computational beamforming. In the first phase T(1), the pattern resulting from the four combined sectors is a wide beam. Depending on the relative phase shift applied to the four channels, the resulting beam may be oriented. It is therefore possible to form, in parallel, in this case in the elevation direction, two separate wide beams 412, 414, respectively to the left and to the right of the field of coverage.

For each of the two beams 412, 414, in a third step, not shown here in FIG. 5, a certain number of distance cells are plotted, the size of which depends on the bandwidth of the radar signal that is used. The intensity of the feedback in each of these cells and for each of the beams makes it possible to detect potential obstacles with a coarse angular resolution.

Then, in the second phase T(2), the first activation pattern is replaced with a second activation pattern in which the second, fourth, sixth and eighth unitary radiating groups 226, 240, 254, 268 are active. The first, second and third steps 404, 406, 108 are then applied using this second pattern in which the radiating groups 226, 240, 254, 268 are more spaced from one another. A second resulting pattern 415 is obtained at the output of the second step 406, in which two lobes 416, 418 of a first beam oriented to the left and two lobes 420, 422 of a second beam oriented to the right are interleaved, thereby making it possible to refine the angular detection resolution of the proximity radar system. In the third step, not shown here in FIG. 5, a second map of the surroundings is obtained, in which the ambiguities associated with the network lobes are removed by virtue of the first map determined in the third step of the first phase T(1).

According to the proximity radar method 402, the definition of the field of coverage of the radar sensor is linked to the geometrical configuration of the unitary radiating group, along the azimuthal and elevational axes. The generation of the synthetic radiation patterns within the field of coverage is linked to the distribution of these unitary radiating groups at the reception sectors and to the geometric patterns for refining the resolution of the radar as the temporal phases T(k) are applied.

Depending on the application or on the flight phase under consideration, it is therefore possible to define the field of coverage and the desired angular resolution within the physical limits of the available antenna support and of the distribution of the radiating elements.

According to a third embodiment, one preferred implementation of the proximity radar system, which aims to obtain a protective bubble for the carrier, consists in positioning three radar sensors around the carrier.

Figure 6:
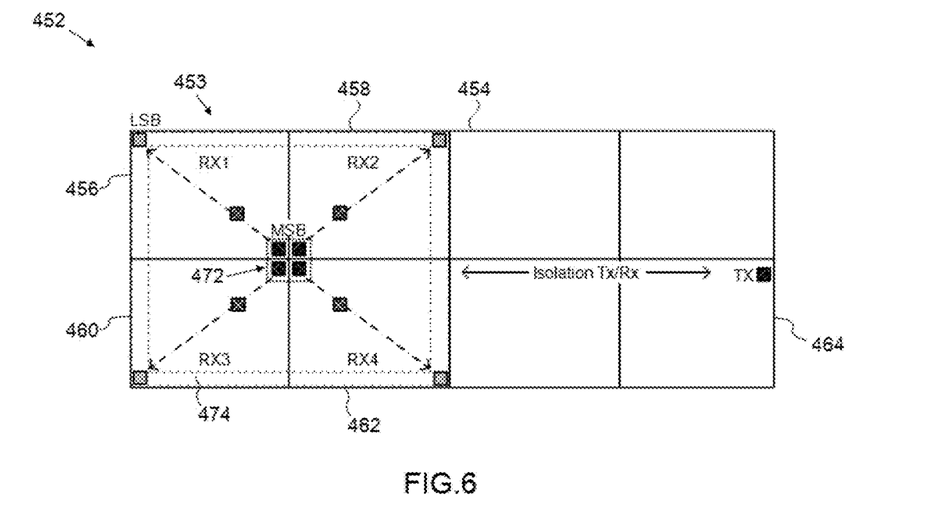
FIG. 6 is a view of an antenna panel of a radar sensor of a proximity radar system according to a third embodiment in which the proximity radar is bistatic.

According to FIG. 6 and the third embodiment of the proximity radar system 452, each radar sensor 453 has an antenna panel 454 having four reception sectors 456, 458, 460, 462 that are positioned in a rectangle and distributed angularly around a central point O, and a separate emission sector 464, isolated from the reception sectors 456, 458, 460, 462.

A first rectangular reception sector Rx1 456, situated to the top left of the reception antenna, has a whole number NK, for example equal to 5, of unitary radiating groups, positioned in series on the diagonal of the first reception sector Rx1 linking the lower right-hand corner of said sector Rx1 to the upper left-hand corner.

A second rectangular reception sector Rx2 458, situated to the top right of the reception antenna, has one and the same whole number NK of unitary radiating groups, positioned in series on the diagonal of the second reception sector Rx2 linking the lower left-hand corner of said sector Rx2 to the upper right-hand corner.

A third rectangular reception sector Rx3 460, situated to the bottom left of the reception antenna, has one and the same whole number NK of unitary radiating groups, positioned in series on the diagonal of the third reception sector Rx3 linking the upper right-hand corner of said sector Rx3 to the lower left-hand corner.

A fourth rectangular reception sector Rx4 462, situated to the bottom right of the reception antenna, has one and the same whole number NK of unitary radiating groups, positioned in series on the diagonal of the fourth reception sector Rx4 linking the upper left-hand corner of said sector Rx4 to the lower right-hand corner.

Each radiating group of each sector is reduced to a single radiating element in order to illuminate the widest possible angular sector.

Similarly to the second embodiment of FIG. 5, the sequential operation of the proximity radar method, implemented by the radar system of FIG. 6, consists in beginning with a phase T(1) using radiating groups close to the common central point O between the four reception sectors, so as to form a first square pattern 472 of four unitary radiating groups, slightly spaced from one another, and so as to obtain unambiguous synthetic patterns during the computational beamforming. In the following phase T(2), the radiating groups are simultaneously spaced in terms of azimuth and in terms of elevation, by replacing the first pattern, by deactivating its four radiating groups, with a wider second square pattern, having four other unitary radiating groups, further from the central point O, in order to produce synthetic patterns with a half as great lobe width and the appearance of a network lobe. The proximity radar method continues through dichotomous progression, by running through the phases in succession until a last temporal phase, in this case denoted T(10), in which the last pattern 474, in this case the tenth one, corresponds to the maximum available deviation of the four radiating groups at the periphery of the reception antenna. The synthetic patterns thus produced are orthogonal and form a binary base for encoding the directions, similarly to what is performed in the part of FIG. 2 corresponding to the third step 108.

It should be noted that the limitations in terms of removing ambiguity stem from the signal-to-noise ratio available in the processed radar echoes. In order to improve the robustness and the accuracy of the proximity radar method according to the invention, Doppler processing is performed by coherently integrating the signal.

If the carrier is moving, the Doppler speed induced in a given direction depends on the angle between this direction and the speed vector of the carrier. This processing is suitable for the phases in which the carrier is moving.

Figure 7:
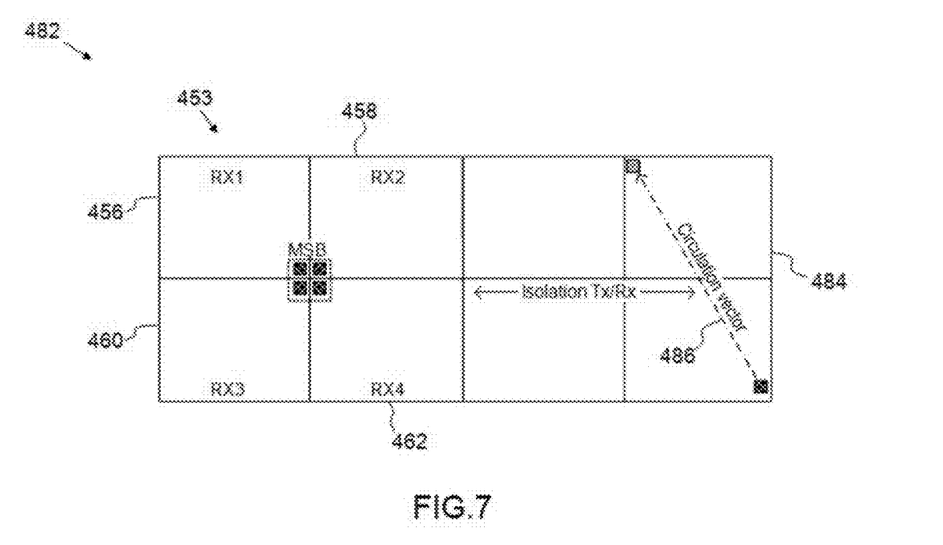
FIG. 7 is a view of an antenna panel of a radar sensor of a proximity radar system according to a variant of the third embodiment in which the emission is circular.

In stationary phases or during very low-speed movements, the Doppler effect is a priori unusable. In order to mitigate this drawback, the invention proposes to implement a circular emission technique, which consists in varying the position of the activated radiating group in the emission sector 484 at emission over time following a circulation vector 486, as described in FIG. 7, derived from FIG. 6 and in which the structure of the reception antenna 456, 458, 460, 462 is kept the same. This causes the space to be "Dopplerized", according to the vector that is used to perform this movement. A dependency between the measured Doppler speed and the direction of the received signal is thus found, thereby making it possible to improve performance in terms of recovering directions of arrival.

According to FIG. 8 and a fourth embodiment, a proximity radar system 502 comprises at least one proximity radar sensor 503 according to the invention described below.

The proximity radar sensor 503 has:
an antenna panel 504 formed of a whole number N, greater than or equal to 2, of reception sectors $506_1$, $506_2$, ..., $506_N$, and of a number M, greater than or equal to 1, of emission sector(s) 508;
N reception channels $510_1$, $510_2$, ..., $510_N$, configured so as to independently demodulate and then respectively digitize the N reception sectors;
M emission channels 512 configured, on the basis of the digitized radar waveforms to be emitted, so as to independently modulate the radar carriers emitted by the M emission sector(s);
an electronic computer 514 for performing proximity radar processing operations and fusing direction/distance map data; and
a display 516 for displaying the proximity situation of the aircraft.

Figure 8:
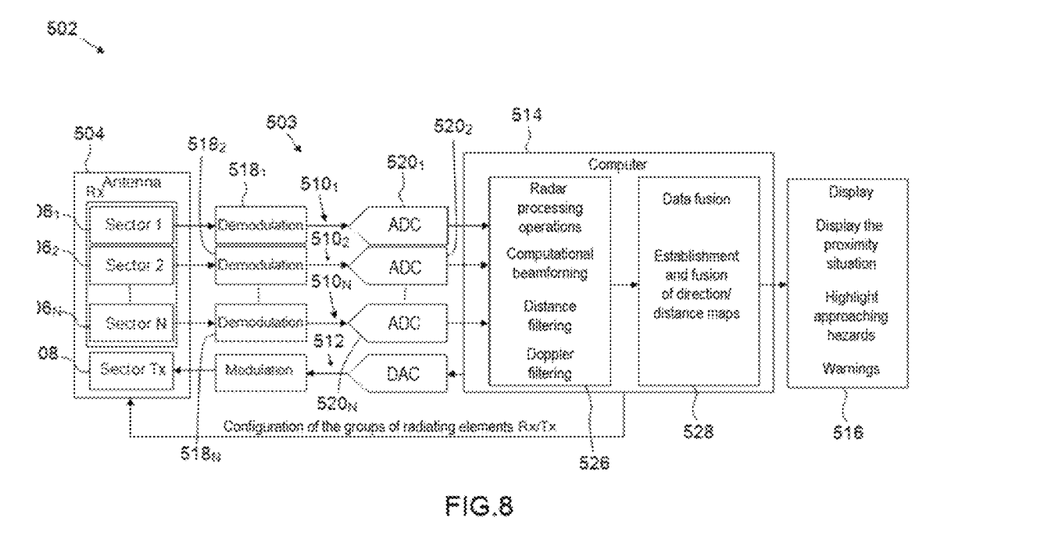
FIG. 8 is a view of the functional architecture of a radar sensor of a proximity radar system according to a fourth embodiment, which generalizes the third embodiment of the proximity radar system described partially in FIG. 6.

The N reception sectors $506_1$, $506_2$, ..., $506_N$ are distributed angularly around a predetermined central point O (not shown in FIG. 8).

Each sector $506_1$, $506_2$, ..., $506_N$, 508, at emission and at reception, comprises a set of a number NK, greater than or equal to 2, of identical unitary radiating groups, each formed of one and the same number NJ, greater than or equal to 1, of radiating element(s), and having an identical radiation pattern.

The radiating elements within each unitary radiating group may be phase-shifted from one another such that all of the unitary radiating groups point in one and the same pointing direction.

The activity of the unitary radiating groups within the reception antenna is able to be configured by the computer 514, with a temporal sequence T(k) of interferometric patterns M(k) of N unitary radiating groups, at a rate of one active radiating group per reception sector and per pattern M(k), k varying from 1 to KN, in which the distance from the current pattern to the central point O and the spacing of the radiating groups increase when k increases.

Each reception channel $510_1$, $510_2$, ..., $510_N$ has a demodulator $518_1$, $518_2$, ..., $518_N$ and an analog-to-digital converter $520_1$, $520_2$, ..., $520_N$ that are connected in series downstream of a corresponding reception sector $506_1$, $506_2$, ... $506_N$.

The electronic computer 514 is configured, by a radar processing module 526, so as, in a temporal phase T(k), to perform computational beamforming of synthetic beams by combining the various reception sectors with chosen phase shifts.

The electronic computer 514 is configured, by a data fusion module 528, so as then, in the same phase T(k), to perform processing operations in order to discriminate the distance cells and the Doppler speed cells, and establish direction/distance maps, with the angular resolution made available by the radiation pattern resulting from the interferometric pattern formed by the active unitary radiating groups of the reception antenna.

The active radiating groups of the reception antenna are then configured, in the following temporal phase T(k+1), so as to obtain a new radiation pattern associated with a following interferometric pattern M(k+1), ideally orthogonal to the preceding interferometric pattern M(k).

The same processing operations as those applied to the preceding interferometric pattern M(k) are applied to the following pattern M(k+1), so as to obtain a new distance/direction map, which is fused with the preceding one.

The method is repeated up to the desired resolution, and then the data are sent to the display 516.

The display 516 is configured so as to signal the obstacles in the proximity of the aircraft, and the potential slow drifts of the carrier and the moving objects in the proximity, with their radial speed.

The disclosed solution requires at least one active antenna with the option of dynamically modifying the configuration of the radiating elements that are activated. This type of antenna may be used for surveillance radars, notably on military helicopters. Advantageously, the proximity radar proposed in this invention may where applicable use the hardware capabilities of such a radar in order to implement its functions. The proposed method would in this case be one particular operating mode of the surveillance radar, which would have resultant advantages since these functionalities would share a single hardware item, this being highly favorable with regard to the mass, the consumption, the bulk and the cost of the device.

Figure 9:
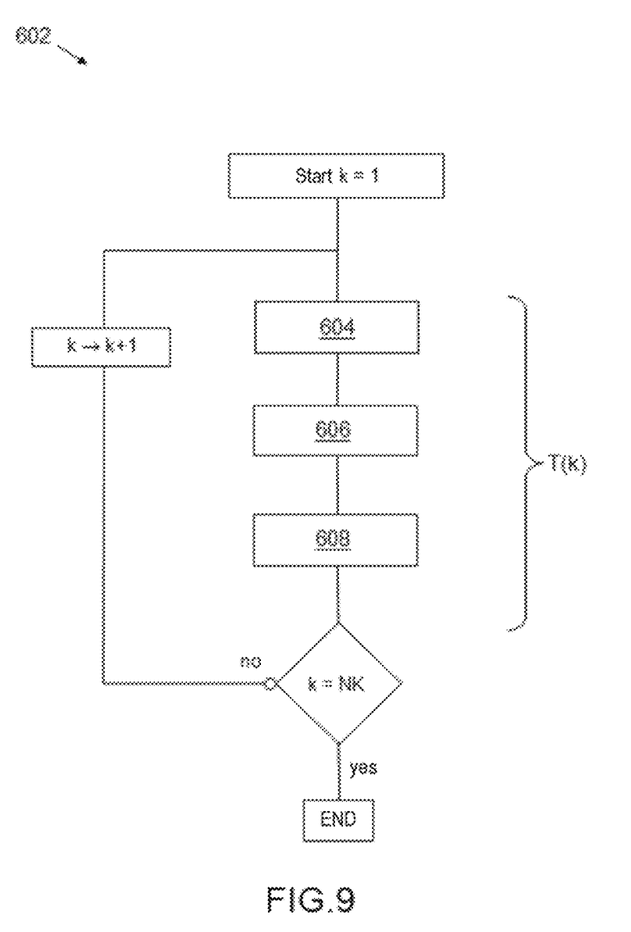
FIG. 9 is a view of a flowchart of a proximity radar method generalizing the proximity radar methods of the first and second embodiments described respectively in FIGS. 2 and 5 and implemented by the proximity radar system of FIG. 8.

According to FIG. 9 and generally speaking, a proximity radar method 602 is implemented by the proximity radar system of FIG. 8 and comprises a set of steps.

The proximity radar method comprises a sequence of phases T(k) of steps, k varying from 1 to NK, characterized in that:
in a first phase T(1), the electronic computer activates, with a first interferometric pattern M(1), at a rate of one active radiating group per reception sector, N active radiating groups closest to the common central point O of the reception sectors, so as to obtain unambiguous synthetic patterns during computational reception beamforming; and then
in the following phases T(k) of steps, executed successively in increasing order of k, for k varying from 2 to NK,
the phase T(k) of steps consists in the electronic computer activating, with an interferometric pattern M(k) associated with the rank k, at a rate of one radiating group per reception sector, N active radiating groups associated with said pattern M(k), deviating more in terms of azimuth and/or in terms of elevation the greater the temporal rank k, so as to produce, in correlation, synthetic patterns during computational reception beamforming with a lobe width half that of the lobes of the preceding pattern M(k−1), and the appearance of a number of network lobes equal to 2 times 2k−1, and so as to establish a map of rank k of the surroundings in terms of azimuth distance/direction and/or elevation distance/direction cells in which the detected obstacle ambiguities, associated with the network lobes, are removed by virtue of the map(s) provided in the phase or phases preceding the phase T(k).

For each phase T(k) of steps, k varying from 1 to NK, the electronic computer executes a first step 604, a second step 606 and a third step 608.

The first step 604, executed in the phase T(k), consists in the electronic computer activating N unitary radiating groups associated with an interferometric pattern M(k), wherein, for k equal to 1, the first pattern M(1) is formed of the N active radiating groups, at a rate of one active radiating group per reception sector, that are closest to the common central point O of the reception sectors, and for k between 2 and NK, the pattern of order k, M(k), is formed of the closest adjacent N active radiating groups, at a rate of one active radiating group per reception sector, that deviate simultaneously in terms of azimuth and in terms of elevation from the active radiating groups of the preceding pattern M(k−1), and the signals received by the N reception sectors associated with the pattern M(k) are demodulated and digitized independently on the corresponding digitized channels and supplied to the electronic computer.

The second step 606, executed in the phase T(k), k being between 1 and NK, consists in two synthetic beams being formed through computation by the electronic computer on the basis of the signals from the N demodulated and digitized sectors by combining said N signals from the reception sectors by suitable phase-shifting operations, 2*(2k−1) network lobes being created in said synthetic beams starting from a rank k equal to 2.

The third step 608, executed in the phase T(k), consists in the computer establishing, on the basis of the synthetic beams computed for the pattern M(k) of rank k, a map of rank k of the surroundings in terms of azimuth distance/direction cells expressed as a direction cosine and/or elevation distance/direction cells expressed as a direction and direction/distance cosine and fusing the map of rank k with the map of preceding rank k−1 when k is greater than or equal to 2 in order to remove possible detected obstacle ambiguities.

It should be noted that different sequences of the phases T(k), k varying from 1 to NK, described in FIGS. 2 and 5 above in which the temporal phases T(k) are associated with a deviation increasing with k may be contemplated.

For example and according to one variant, it is possible to start with an initial phase T(1) in which the unitary radiating groups of the first pattern M(1) are spaced and ambiguous, and continue the method in the following phases with unitary radiating groups, associated with following patterns M(k), that approach one another as k increases. In this case, the ambiguity is removed by virtue of the following phases T(k) and not the preceding phases. This method appears "less natural" but is equivalent, from the processing standpoint, to those of the embodiments described in FIGS. 2 and 5, and may be implemented. In other words, the order of the phases T(k) of an initial method in which the deviation of the unitary radiating groups in terms of azimuth and/or in terms of elevation increases may be replaced by any order if the patterns M(k), k varying from 1 to NK, form an interferometric base.

It should also be noted that, even if during the various temporal phases, a dichotomous progression is ideally to be preferred, this dichotomous progression resulting in a deviation by powers of 2 and in a number of network lobes of 2k−1, it is possible to use other deviations, provided that they make it possible to remove ambiguities.

In particular, if an existing antenna network with a given distribution of unitary radiating groups is used, the available configurations will not make it possible to exactly provide a dichotomous progression, but might offer a progression compatible with an interferometric base, able to be used to detect targets in the proximity of the aircraft.

Generally speaking, a proximity radar method for a rotary-wing aircraft is implemented by a proximity radar system comprising at least one radar sensor having:

an antenna panel, formed of a whole number N greater than or equal to 2 of reception sectors and at least one emission sector; and N reception channels, configured so as to independently demodulate and then respectively digitize the N reception sectors; and an emission channel, configured so as to modulate a radar emission waveform on a radar carrier to be emitted by the at least one emission sector;

an electronic computer, configured so as to perform proximity radar processing operations and fuse direction/distance map data; and a display for displaying the proximity situation of the aircraft;

the N reception sectors being distributed around a predetermined common central point O; and each of the N reception sectors having one and the same number NK, greater than or equal to 2, of unitary radiating groups whose position in terms of azimuth and/or in terms of elevation varies between the central point O and the periphery of their sector, and pointing in one and the same pointing direction with an identical radiation pattern.

The proximity radar method comprises a sequence of phases T(k) of steps, executed successively as a function of k, k varying from 1 to NK, wherein each phase T(k) of steps consists in the electronic computer activating, with an interferometric pattern M(k) associated with the rank k, at a rate of one radiating group per reception sector, N active radiating groups associated with said interferometric pattern M(k), whose position in terms of azimuth and/or in terms of elevation varies as a function of the temporal rank k between the central point O and the periphery of their sector without passing through one and the same position again, so as to produce, in correlation, synthetic patterns during computational reception beamforming with a lobe width and the appearance of a number of network lobes that vary as a function of the temporal rank k, and so as to establish a map of rank k of the surroundings in terms of azimuth distance/direction and/or elevation distance/direction cells in which the detected obstacle ambiguities, associated with the network lobes, are removed by virtue of the map(s) provided in the phase or phases preceding and/or following the phase T(k).

Generally speaking, a proximity radar system for a rotary-wing aircraft comprises at least one radar sensor having:

an antenna panel, formed of a whole number N greater than or equal to 2 of reception sectors and at least one emission sector; and N reception channels, configured so as to independently demodulate and then respectively digitize the N reception sectors; and an emission channel, configured so as to modulate a radar emission waveform on a radar carrier to be emitted by the at least one emission sector;

an electronic computer, configured so as to perform proximity radar processing operations and fuse direction/distance map data; and a display for displaying the proximity situation of the aircraft;

the N reception sectors being distributed around a predetermined common central point O; and each of the N reception sectors having one and the same number NK, greater than or equal to two, of unitary radiating groups whose position in terms of azimuth and/or in terms of elevation varies between the central point O and the periphery of their sector, and pointing in one and the same pointing direction with an identical radiation pattern.

The electronic computer is configured so as to implement a proximity radar method by implementing a sequence of phases T(k) of steps, k varying from 1 to NK, wherein: each phase T(k) of steps consists in the electronic computer activating, with an interferometric pattern M(k) associated with the rank k, at a rate of one radiating group per reception sector, N active radiating groups associated with said interferometric pattern M(k), whose position in terms of azimuth and/or in terms of elevation varies as a function of the temporal rank k, so as to produce, in correlation, synthetic patterns during computational reception beamforming with a lobe width and the appearance of a number of network lobes that vary as a function of the temporal rank k, and so as to establish a map of rank k of the surroundings in terms of azimuth distance/direction and/or elevation distance/direction cells in which the detected obstacle ambiguities, associated with the network lobes, are removed by virtue of the map(s) provided in the phase or phases preceding and/or following the phase T(k).

The invention claimed is:

1. A proximity radar method for a rotary-wing aircraft, implemented by a proximity radar system comprising at least one radar sensor having:

an antenna panel, formed of a whole number N greater than or equal to 2 of reception sectors and at least one emission sector; and N reception channels configured so as to independently demodulate and then respectively digitize the N reception sectors; and an emission channel, configured so as to modulate a radar emission waveform on a radar carrier to be emitted by the at least one emission sector;

an electronic computer, configured so as to perform proximity radar processing operations and fuse direction/distance map data; and a display for displaying the proximity situation of the aircraft;

the N reception sectors being distributed around a predetermined common central point O; and each of the N reception sectors having one and the same number NK, greater than or equal to 2, of unitary radiating groups whose position in terms of azimuth and/or in terms of elevation varies between the central point O and the periphery of their sector, and pointing in one and the same pointing direction with an identical radiation pattern, the proximity radar method comprising a sequence of phases T(k) of steps, executed successively as a function of k, k varying from 1 to NK, wherein:

each phase T(k) of steps consists in the electronic computer activating, with an interferometric pattern M(k) associated with the rank k, at a rate of one radiating group per reception sector, N active radiating groups associated with said interferometric pattern M(k), whose position in terms of azimuth and/or in terms of elevation varies as a function of the temporal rank k between the central point O and the periphery of their sector without passing through one and the same position again, so as to produce, in correlation, synthetic patterns during computational reception beamforming with a lobe width and the appearance of a number of network lobes that vary as a function of the temporal rank k, and so as to establish a map of rank k of the surroundings in terms of azimuth distance/direction and/or elevation distance/direction cells wherein the detected obstacle ambiguities, associated with the network lobes, are removed by virtue of the map(s) provided in the phase or phases preceding and/or following the phase T(k).

2. The proximity radar method as claimed in claim 1, wherein the N reception sectors are distributed angularly around a predetermined common central point O; and each of the N reception sectors has one and the same number NK, greater than or equal to 2, of unitary radiating groups that deviate in terms of azimuth and/or in terms of elevation toward the periphery of their sector, and pointing in one and the same pointing direction with an identical radiation pattern; and the sequence of phases T(k) of steps of the proximity radar method, k varying from 1 to NK, is wherein:

in a first phase T(1), the electronic computer activates, with a first interferometric pattern M(1), at a rate of one active radiating group per reception sector, N active radiating groups closest to the common central point O of the reception sectors, so as to obtain unambiguous synthetic patterns during computational reception beamforming; and then in the following phases T(k) of steps, executed successively in increasing order of k, for k varying from 2 to NK, the phase T(k) of steps consists in the electronic computer activating, with an interferometric pattern M(k) associated with the rank k, at a rate of one radiating group per reception sector, N active radiating groups associated with said pattern M(k), deviating more in terms of azimuth and/or in terms of elevation the greater the temporal rank k, so as to produce, in correlation, synthetic patterns during computational reception beamforming with a lobe width half that of the lobes of the preceding pattern M(k−1), and the appearance of a number of network lobes equal to 2 times 2k−1, and so as to establish a map of rank k of the surroundings in terms of azimuth distance/direction and/or elevation distance/direction cells wherein the detected obstacle ambiguities, associated with the network lobes, are removed by virtue of the map(s) provided in the phase or phases preceding the phase T(k).

3. The proximity radar method as claimed in claim 2, wherein, for each phase T(k) of steps, k varying from 1 to NK, the electronic computer executes a first step, a second step and a third step;

the first step, executed in the phase T(k), consisting in the electronic computer activating N unitary radiating groups associated with an interferometric pattern M(k), wherein, for k equal to 1, the first pattern M(1) is formed of the N active radiating groups, at a rate of one active radiating group per reception sector, that are closest to the common central point O of the reception sectors, and for k between 2 and NK, the pattern of order k, M(k), is formed of the closest adjacent N active radiating groups, at a rate of one active radiating group per reception sector, that deviate simultaneously in terms of azimuth and in terms of elevation from the active radiating groups of the preceding pattern M(k−1); and the signals received by the N reception sectors associated with the pattern M(k) are demodulated and digitized independently on the corresponding digitized channels and supplied to the electronic computer; and the second step, executed in the phase T(k), k being between 1 and NK, consisting in two synthetic beams being formed through computation by the electronic computer on the basis of the signals from the N demodulated and digitized sectors by combining said N signals from the reception sectors by suitable phase-shifting operations, 2*(2k−1) network lobes being created in said synthetic beams starting from a rank k equal to 2; and the third step, executed in the phase T(k), consisting in the computer establishing, on the basis of the synthetic beams computed for the pattern M(k) of rank k, a map of rank k of the surroundings in terms of azimuth distance/direction cells expressed as a direction cosine and/or elevation distance/direction cells expressed as a direction and direction/distance cosine and fusing the map of rank k with the map of preceding rank k−1 when k is greater than or equal to 2 in order to remove possible detected obstacle ambiguities.

4. The proximity radar method as claimed in claim 3, furthermore comprising a display step executed after the third step of each phase T(k) starting from a predetermined rank k greater than or equal to 2, wherein the display is configured so as to display the proximity situation of the aircraft, highlight approaching hazards and warnings.

5. The proximity radar method as claimed in claim 1, wherein the at least one emission sector is contained within the reception sectors and the proximity radar operates in a monostatic mode; or the at least one emission sector is separate and remote from the reception sectors and the proximity radar operates in a bistatic mode.

6. The proximity radar method as claimed in claim 5, wherein when the radar operates in a bistatic mode, at least one unitary emission radiating group, configured so as to point in the same pointing direction as that of the unitary radiating groups of the reception sectors and having the same radiation pattern, is activated statically; and/or at least two unitary emission radiating groups configured so as to point in the same pointing direction as that of the unitary radiating groups of the reception sectors and having the same radiation pattern are activated dynamically, by making the activation of the radiating groups circulate so as to follow at least one circulation vector.

7. A proximity radar system for a rotary-wing aircraft comprising at least one radar sensor having:

an antenna panel, formed of a whole number N greater than or equal to 2 of reception sectors and at least one emission sector; and N reception channels configured so as to independently demodulate and then respectively digitize the N reception sectors; and an emission channel, configured so as to modulate a radar emission waveform on a radar carrier to be emitted by the at least one emission sector;

an electronic computer, configured so as to perform proximity radar processing operations and fuse direction/distance map data; and a display for displaying the proximity situation of the aircraft;

the N reception sectors being distributed around a predetermined common central point O; and each of the N reception sectors having one and the same number NK, greater than or equal to two, of unitary radiating groups whose position in terms of azimuth and/or in terms of elevation varies between the central point O and the periphery of their sector, and pointing in one and the same pointing direction with an identical radiation pattern;

the electronic computer being configured so as to implement a proximity radar method by executing a sequence of phases T(k) of steps, k varying from 1 to NK, wherein each phase T(k) of steps consists in the electronic computer activating, with an interferometric pattern M(k) associated with the rank k, at a rate of one radiating group per reception sector, N active radiating groups associated with said interferometric pattern M(k), whose position in terms of azimuth and/or in terms of elevation varies as a function of the temporal rank k so as to produce, in correlation, synthetic patterns during computational reception beamforming with a lobe width and the appearance of a number of network lobes that vary as a function of the temporal rank k, and so as to establish a map of rank k of the surroundings in terms of azimuth distance/direction and/or elevation distance/direction cells wherein the detected obstacle ambiguities, associated with the network lobes, are removed by virtue of the map(s) provided in the phase or phases preceding and/or following the phase T(k).

8. The proximity radar system as claimed in claim 7, wherein:

the N reception sectors are distributed angularly around a predetermined common central point O; and each of the N reception sectors having one and the same number NK, greater than or equal to two, of unitary radiating groups that deviate in terms of azimuth and/or in terms of elevation toward the periphery of their sector pointing in one and the same pointing direction with an identical radiation pattern;

the sequence of phases T(k) of steps, k varying from 1 to NK, is implemented by starting with a first phase T(1) wherein the computer activates, with a first interferometric pattern M(1), at a rate of one active radiating group per reception sector, N active radiating groups closest to the common central point O of the reception sectors, so as to obtain unambiguous synthetic patterns during computational reception beamforming; and then by successively executing, for k varying from 2 to NK, the phases T(k), the phase T(k) of steps consisting in the electronic computer activating, with an interferometric pattern M(k) associated with the rank k, at a rate of one radiating group per reception sector, N active radiating groups associated with said pattern M(k), deviating more in terms of azimuth and/or in terms of elevation the greater the temporal rank k, so as to produce, in correlation, synthetic patterns during computational reception beamforming with a lobe width half that of the lobes of the preceding pattern M(k−1), and the appearance of a number of network lobes equal to 2 times 2k−1, and so as to establish a map of the surroundings in terms of azimuth distance/direction and/or elevation distance/direction cells wherein the detected obstacle ambiguities, associated with the network lobes, are removed by virtue of the map(s) provided in the phase or phases preceding the phase T(k).

9. The proximity radar system as claimed in claim 7, wherein
each unitary radiating group of the N reception sectors is formed of a single radiating element, all of the radiating elements of the N reception sectors having an identical radiation pattern; or
each unitary radiating group of the N reception sectors is formed of one and the same number NJ, greater than or equal to 2, of radiating elements, the radiating elements being spaced from one another by less than one wavelength λ of the radar carrier.

10. The proximity radar system as claimed in claim 9, wherein
each unitary radiating group of the N reception sectors is formed of one and the same number NJ, greater than or equal to 2, of radiating elements, the radiating elements being spaced from one another by less than one wavelength λ of the radar carrier, and all of the unitary radiating groups are oriented identically on the antenna panel; and
the radiating elements forming each unitary radiating group are phase-shifted from one another by one and the same network of phase shifters, connected in parallel to one and the same summing circuit, of the channel of the reception sector to which the unitary radiating group belongs.

11. The proximity radar system as claimed in claim 10, wherein
each unitary radiating group of the N reception sectors is formed of two radiating elements, spaced from one another by less than one wavelength λ of the radar carrier, and aligned with one another on the antenna panel along its axis of elevation; and
the two radiating elements forming each unitary radiating group are phase-shifted from one another by one and the same angle Δα such that all of the radiating groups point in one and the same direction having a non-zero elevation angle and a zero azimuth angle.

12. The proximity radar system as claimed in claim 7, wherein
the NK unitary radiating groups of each reception sector are positioned regularly and substantially along the bisector of said reception sector, starting from an area close to the central point O and going toward the periphery of said reception sector.

13. The proximity radar system as claimed in claim 7, wherein
at least one emission sector is contained within the reception sectors and the proximity radar system is monostatic; or
at least one emission sector is separate and remote from the reception sectors and the proximity radar system is bistatic.

14. The proximity radar system as claimed in claim 7, wherein
the radar system is bistatic; and
at least one unitary emission radiating group, configured so as to point in the same pointing direction as that of the unitary radiating groups of the reception sectors and having the same radiation pattern, is or are activated statically; and/or
at least two unitary emission radiating groups, configured so as to point in the same pointing direction as that of the unitary radiating groups of the reception sectors and having the same radiation pattern, are activated dynamically, by making the activation of the active radiating groups circulate so as to follow at least one circulation vector.

15. The proximity radar system as claimed in claim 7, wherein
the electronic computer is configured so as to execute, in each phase T(k) of steps, k varying from 1 to Nk, a first step, a second step and a third step,
the first step, executed in the phase T(k), consisting in the electronic computer activating N unitary radiating groups associated with an interferometric pattern M(k), wherein, for k equal to 1, the first pattern M(1) is formed of the N active radiating groups, at a rate of one active radiating group per reception sector, that are closest to the common central point O of the reception sectors, and for k between 2 and NK, the pattern of order k, M(k), is formed of the closest adjacent N active radiating groups, at a rate of one active radiating group per reception sector, that deviate in terms of azimuth and/or in terms of elevation from the active radiating groups of the preceding pattern M(k−1); and the signals received by the N reception sectors associated with the pattern M(k) are demodulated and digitized independently on the corresponding digitized channels and supplied to the electronic computer; and
the second step, executed in the phase T(k), k being between 1 and NK, consisting in two synthetic beams being formed through computation by the electronic computer on the basis of the signals from the N demodulated and digitized sectors by combining said N signals from the reception sectors by suitable phase-shifting operations, 2*(2k−1) network lobes being created in said synthetic beams starting from a rank k equal to 2; and
the third step, executed in the phase T(k), consisting in the computer establishing, on the basis of the synthetic beams computed for the pattern M(k) of rank k, a map of rank k of the surroundings in terms of azimuth distance/direction cells expressed as a direction cosine and/or elevation distance/direction cells expressed as a direction and direction/distance cosine and fusing the map of rank k with the map of preceding rank k−1 when k is greater than or equal to 2 in order to remove possible detected obstacle ambiguities.

16. The proximity radar system as claimed in claim 7, wherein
the display is configured so as to display the proximity situation of the aircraft, highlight approaching hazards and warnings.

17. The proximity radar system as claimed in claim 7, comprising three identical radar sensors, positioned around the carrier of the aircraft so as to form a protective bubble for the carrier.

* * * * *